United States Patent
Corral et al.

(10) Patent No.: US 12,413,435 B2
(45) Date of Patent: Sep. 9, 2025

(54) SYSTEMS AND METHODS FOR AN ONLINE MEDIA MARKETPLACE

(71) Applicant: VERONA HOLDINGS SEZC, George Town (KY)

(72) Inventors: Edward Corral, Houston, TX (US); Cedric Cobban, Sherbrooke (CA)

(73) Assignee: VERONA HOLDINGS SEZC, George Town (KY)

( * ) Notice: Subject to any disclaimer, the term of this patent is extended or adjusted under 35 U.S.C. 154(b) by 0 days.

(21) Appl. No.: 17/379,783

(22) Filed: Jul. 19, 2021

(65) Prior Publication Data

US 2021/0367797 A1      Nov. 25, 2021

Related U.S. Application Data

(63) Continuation of application No. 16/537,466, filed on Aug. 9, 2019, now abandoned.

(60) Provisional application No. 62/717,738, filed on Aug. 10, 2018.

(51) Int. Cl.
| | |
|---|---|
| *G06Q 20/12* | (2012.01) |
| *G06Q 20/06* | (2012.01) |
| *G06Q 20/36* | (2012.01) |
| *G06Q 20/38* | (2012.01) |
| *H04L 12/14* | (2006.01) |
| *H04L 67/53* | (2022.01) |
| *H04L 65/61* | (2022.01) |

(52) U.S. Cl.
CPC ..... *H04L 12/1453* (2013.01); *G06Q 20/0658* (2013.01); *G06Q 20/123* (2013.01); *G06Q 20/3678* (2013.01); *G06Q 20/389* (2013.01); *H04L 67/53* (2022.05); *H04L 65/61* (2022.05)

(58) Field of Classification Search
CPC ..... H04L 12/1253; H04L 67/53; H04L 65/61; G06Q 20/0658; G06Q 20/123; G06Q 20/3678; G06Q 20/389
See application file for complete search history.

(56) References Cited

U.S. PATENT DOCUMENTS

| | | | |
|---|---|---|---|
| 5,918,213 A | 6/1999 | Bernard et al. | |
| 5,963,916 A | 10/1999 | Kaplan | |
| 6,233,682 B1 | 5/2001 | Fritsch | |
| 6,385,596 B1 | 5/2002 | Wiser et al. | |
| 6,868,394 B1 | 3/2005 | Mele | |
| 6,952,685 B1 | 10/2005 | Hunter et al. | |

(Continued)

FOREIGN PATENT DOCUMENTS

WO   WO-2020032990 A1 *   2/2020   ............. G06F 21/10

*Primary Examiner* — Peter D Nolan
*Assistant Examiner* — Matthew Cobb
(74) *Attorney, Agent, or Firm* — RMCK Law Group, PLC

(57) ABSTRACT

Systems and methods for a comprehensive online media marketplace are provided that increase the efficiency of media sharing between consumers and content producers. In one embodiment, a method comprising streaming media content from a streaming platform to a consumer device, creating a stream report for the media content based on a smart contract associated with the media content, wherein the smart contract identifies a media content producer of the media content, recording the stream report on a blockchain, issuing tokens based on a pre-determined rate of inflation, and distributing a portion of the tokens to the media content producer based on the stream report.

15 Claims, 8 Drawing Sheets

(56) References Cited

U.S. PATENT DOCUMENTS

| | | |
|---|---|---|
| 7,209,892 B1 | 4/2007 | Galuten et al. |
| 7,478,063 B2 | 1/2009 | Knight |
| RE41,137 E | 2/2010 | Hunter et al. |
| 7,734,501 B2 | 6/2010 | Hahn et al. |
| 7,797,242 B2 | 9/2010 | Gautier et al. |
| 7,890,374 B1 | 2/2011 | Khan et al. |
| 7,895,081 B1 | 2/2011 | Saltzman et al. |
| 7,913,273 B2 | 3/2011 | Beccaro et al. |
| 8,271,341 B2 | 9/2012 | Rosenberg et al. |
| 8,364,540 B2 | 1/2013 | Soroca et al. |
| 8,468,099 B2 | 6/2013 | Headings et al. |
| 8,543,574 B2 | 9/2013 | Ke et al. |
| 8,543,575 B2 | 9/2013 | Martin et al. |
| 10,325,257 B1 | 6/2019 | Winklevoss et al. |
| 11,165,999 B1 | 11/2021 | Wieder |
| 2001/0016836 A1 | 8/2001 | Boccon-Gibod et al. |
| 2001/0025259 A1 | 9/2001 | Rouchon |
| 2002/0035519 A1 | 3/2002 | Takizawa |
| 2004/0193544 A1 | 9/2004 | Varadarajan et al. |
| 2005/0251453 A1 | 11/2005 | Lu |
| 2007/0083471 A1 | 4/2007 | Robbin et al. |
| 2007/0174341 A1 | 7/2007 | Saripalli et al. |
| 2007/0220580 A1 | 9/2007 | Putterman et al. |
| 2007/0250400 A1 | 10/2007 | Eglen et al. |
| 2008/0215426 A1 | 9/2008 | Guldimann et al. |
| 2009/0243517 A1 | 10/2009 | Verfuerth et al. |
| 2009/0253517 A1 | 10/2009 | Bererton et al. |
| 2010/0168880 A1 | 7/2010 | Liu et al. |
| 2011/0166949 A1 | 7/2011 | Nguyen et al. |
| 2012/0101886 A1 | 4/2012 | Subramanian et al. |
| 2012/0185488 A1 | 7/2012 | Oppenheimer |
| 2012/0265853 A1 | 10/2012 | Knox et al. |
| 2012/0271701 A1 | 10/2012 | Keck |
| 2013/0190072 A1 | 7/2013 | Nicholas et al. |
| 2014/0032363 A1 | 1/2014 | Zhao et al. |
| 2014/0058892 A1 | 2/2014 | Camelio |
| 2015/0058227 A1* | 2/2015 | Dua .............. G06Q 20/3674 |
| | | 705/67 |
| 2015/0310476 A1 | 10/2015 | Gadwa |
| 2015/0324764 A1 | 11/2015 | Rooyen et al. |
| 2015/0325764 A1 | 11/2015 | Rantala |
| 2016/0203572 A1 | 7/2016 | McConaghy et al. |
| 2016/0358161 A1* | 12/2016 | Cobban ........... G06Q 20/0655 |
| 2017/0185981 A1 | 6/2017 | Emmerson |
| 2019/0080402 A1* | 3/2019 | Molinari ........... G06Q 20/223 |
| 2019/0114707 A1* | 4/2019 | McSheehan ........ G06Q 20/381 |
| 2020/0005284 A1* | 1/2020 | Vijayan ............. C06Q 20/065 |
| 2020/0143014 A1* | 5/2020 | LeBeau .............. H04L 9/3236 |

* cited by examiner

SYSTEMS AND METHODS FOR AN ONLINE MEDIA MARKETPLACE

CROSS REFERENCE TO RELATED APPLICATIONS

The present application is a continuation of a U.S. patent application Ser. No. 16/537,466, entitled "SYSTEMS AND METHODS FOR AN ONLINE MEDIA MARKETPLACE", and filed on Aug. 9, 2019. U.S. patent application Ser. No. 16/537,466 claims priority to U.S. Provisional Patent Application No. 62/717,738, entitled "SYSTEMS AND METHODS FOR AN ONLINE MEDIA MARKETPLACE," and filed on Aug. 10, 2018. The entire contents of the above-identified application are hereby incorporated by reference for all purposes. The entire contents of U.S. Provisional Patent Application No. 62/171,485, entitled "SYSTEMS AND METHODS FOR AN ONLINE MUSIC MARKETPLACE," filed on Jun. 5, 2015, and U.S. patent application Ser. No. 15/174,943 entitled "SYSTEM AND METHODS FOR AN ONLINE MUSIC MARKETPLACE," filed on Jun. 6, 2016, are also hereby incorporated by reference for all purposes.

BACKGROUND AND SUMMARY

In the modern world, consumers can stream and/or download songs, movies, TV shows, and other forms of digital media content. In many cases, consumers pay for the right to stream and/or download this digital media content via online entertainment libraries such as Spotify, iTunes, Pandora, Amazon, Hulu, Netflix, HBO, etc.

However, the inventors herein have recognized potential issues with such entertainment libraries. For example, from the media producer's perspective, such entertainment libraries are undesirable because they do not pay the media content producers well. Free streaming services may not even pay the media content producers at all. And, even the paid streaming services fail to pay the media content producers well because the third party entertainment libraries often hold a significant percentage of the income for themselves. To further complicate issues, many media content producers may have difficulty getting discovered by their target audiences, particularly new media content producers, since these less popular media content producers often get drowned out by already well-established pop media content producers.

Further, these third party entertainment libraries offer little transparency for the media producers. In particular, entertainment libraries do not inform the media producers about the streaming history of their consumers, such as who is listening to their content, what content is being listened to, and for how long. Due this lack of transparency, media producers may have a difficult time tracking how well their content is being received, and payments to the media producers may be susceptible to manipulation or alteration, and. Further, any reporting that the entertainment libraries do perform is irregular, and may be compiled together so that media producers have difficulty tracking individual streams.

From the user's perspective, paid streaming services are undesirable because users have to pay for the content. Further, as noted above, many users may find it difficult to find media content producers that they like, especially if those media content producers are less popular, because users may be inundated with only the well-established media content producers.

The inventors herein have recognized the issues described above and have devised systems and methods for addressing the issues. In particular, systems and methods for an online media marketplace and user interface are provided. More specifically, the methods and systems described herein provide an approach for recording a history of consumers' media content streaming, and for paying media content producers through the inflation of the blockchain's market cap/cryptocurrency token. The present invention therefore provides, among other advantages, methods and systems for securely recording consumers' streaming history, and paying the media content producers through a royalty payment generated through the steady inflation of the market cap of a blockchain's utility token. In one embodiment, a method comprising streaming media content from a streaming platform to a consumer device, creating a stream report for the media content based on a smart contract associated with the media content, wherein the smart contract identifies a media content producer of the media content, recording the stream report on a blockchain, issuing tokens based on a predetermined rate of inflation, and distributing a portion of the tokens to the media content producer based on the stream report.

Thus, the blockchain itself may pay the media content producers. In this way, both the users and the media content producers benefit: users may be able stream content without paying a subscription fee (in some examples), and media content producers get paid without losing any of their profits to third party intermediaries. Further, by coupling the accurate and immutable streaming accounting offered by the blockchain, with the steady inflation of the blockchain's tokens, media producers an extra, transparent payment mechanism is achieved. Media content producers can see how much their media content is being streamed on the blockchain and can verify that the payment they receive fairly and accurately reflects the amount that their content was streamed. Further, by utilizing the blockchain, the stream reporting may be more efficient, reported with greater regularity, and may be more granular than other reporting systems.

Thus, a streaming system is provided that manages to pay media content producers for their content through a royalty payment generated by the steady inflation of the market cap of a blockchain's media content tokens. In other words, even though the streaming/downloading service may in some examples be subscription-free for users, media content producers are still paid for their content.

In another representation, a method comprises: creating a smart contract when a media content producer uploads media content; streaming the media content to a consumer; generating a stream report based on a duration of the stream; and reporting the stream report to a blockchain, the blockchain comprising a media content token payment system, wherein the media content token payment system issues cryptocurrency in the form of a media content token to the media content producer in exchange for the stream to the consumer.

In yet a further representation, a system comprises a remote server in wireless communication with a consumer device and a media content producer device for receiving and storing media content uploaded from the media content producer device and delivering the media content to the consumer device, the remote server comprising computer readable instruction stored in non-transitory memory for: receiving a stream request from a media content consumer; streaming the requested media content to the consumer; generating a stream report when the consumer finishes the stream; and reporting the stream report to a blockchain, the blockchain comprising a media content token payment system, wherein the media content token payment system issues cryptocurrency in the form of a media content token to the media content producer in exchange for the stream of the requested media content.

The above summary is provided to introduce a selection of concepts in a simplified form that are further described below in the Detailed Description. This summary is not intended to identify key features or essential features of the subject matter, nor is it intended to be used to limit the scope of the subject matter. Furthermore, the subject matter is not limited to implementations that solve any or all of the disadvantages noted above or in any part of this disclosure.

DETAILED DESCRIPTION

Methods and systems are provided herein for an online media marketplace that uses a blockchain to pay media content producers. A plurality of consumers and media content producers may be connected with one another on a network including a blockchain, such as the example networks shown in FIGS. 1-3. The blockchain and the value of its tokens may be maintained like any other blockchain: by mining devices that store a record of the blockchain ledger, check the validity of new blocks added to the blockchain, and perform calculations to incorporate new information within the blockchain in the form of a new block. Additionally, the value of the token associated with the blockchain may be stabilized by a vesting process, wherein certain users vest, or lock away, amounts of the token in vesting devices for a period of time, in exchange for certain rights or benefits. While vested, tokens may not be sold or traded, thereby reducing the effective circulating supply of the token.

The media content producers may upload their media content to one or more media streaming platforms and may create a smart contract for each of the pieces of media content (e.g., each song) that they upload. This smart contract may include information such as the media content producer's identity/corresponding digital wallet address, so that when the media content producer's content is streamed, that stream can be traced back to the media content producer. Thus, the streaming platforms in turn stream the media content to various consumers. The consumers therefore, may stream media content through the one or more streaming platforms.

Figure 4A:
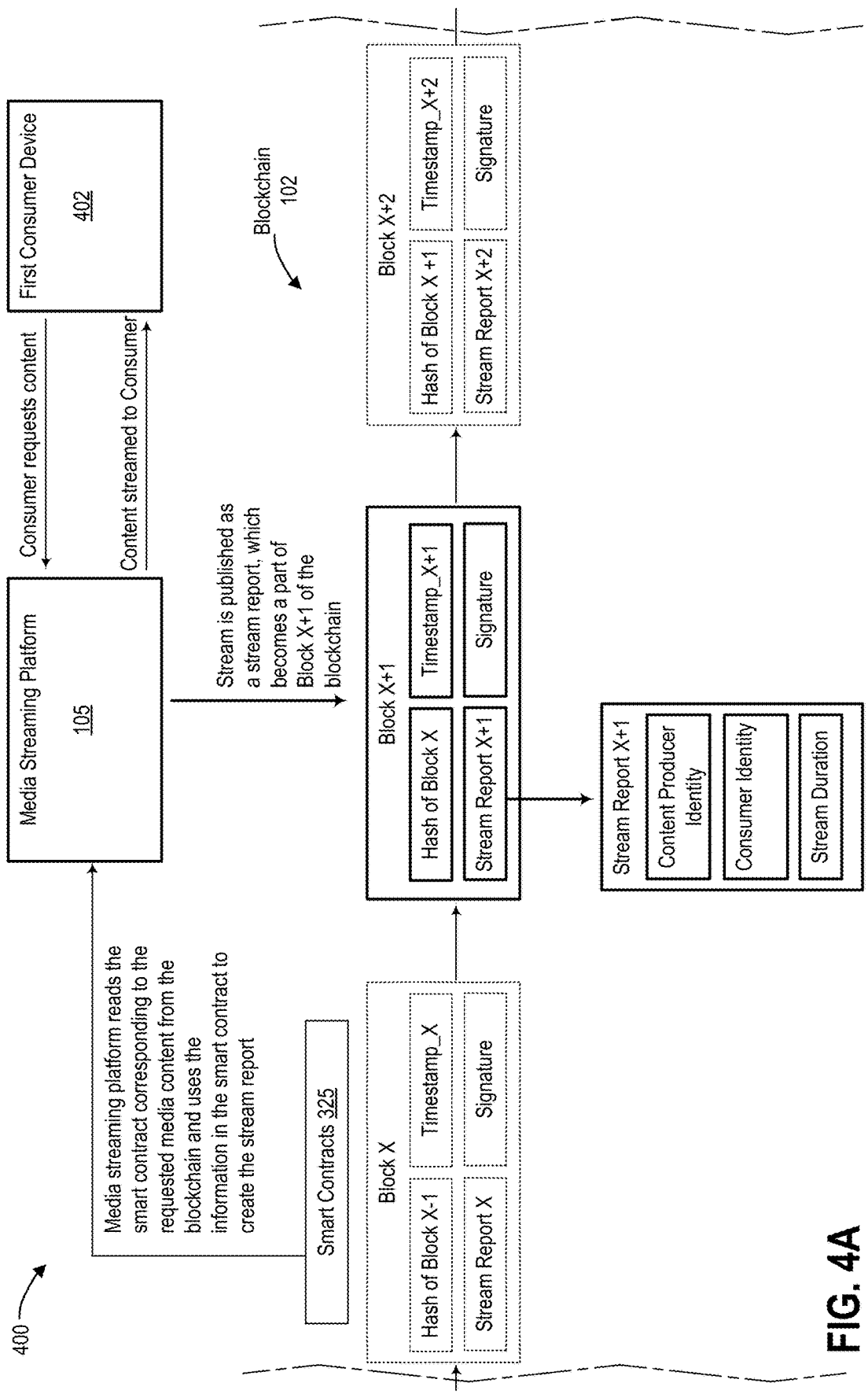
FIG. 4A shows a block diagram of an example of how a media content stream may be reported to the blockchain of FIGS. 1-3, in accordance with an embodiment of the present disclosure.
Figure 4B:
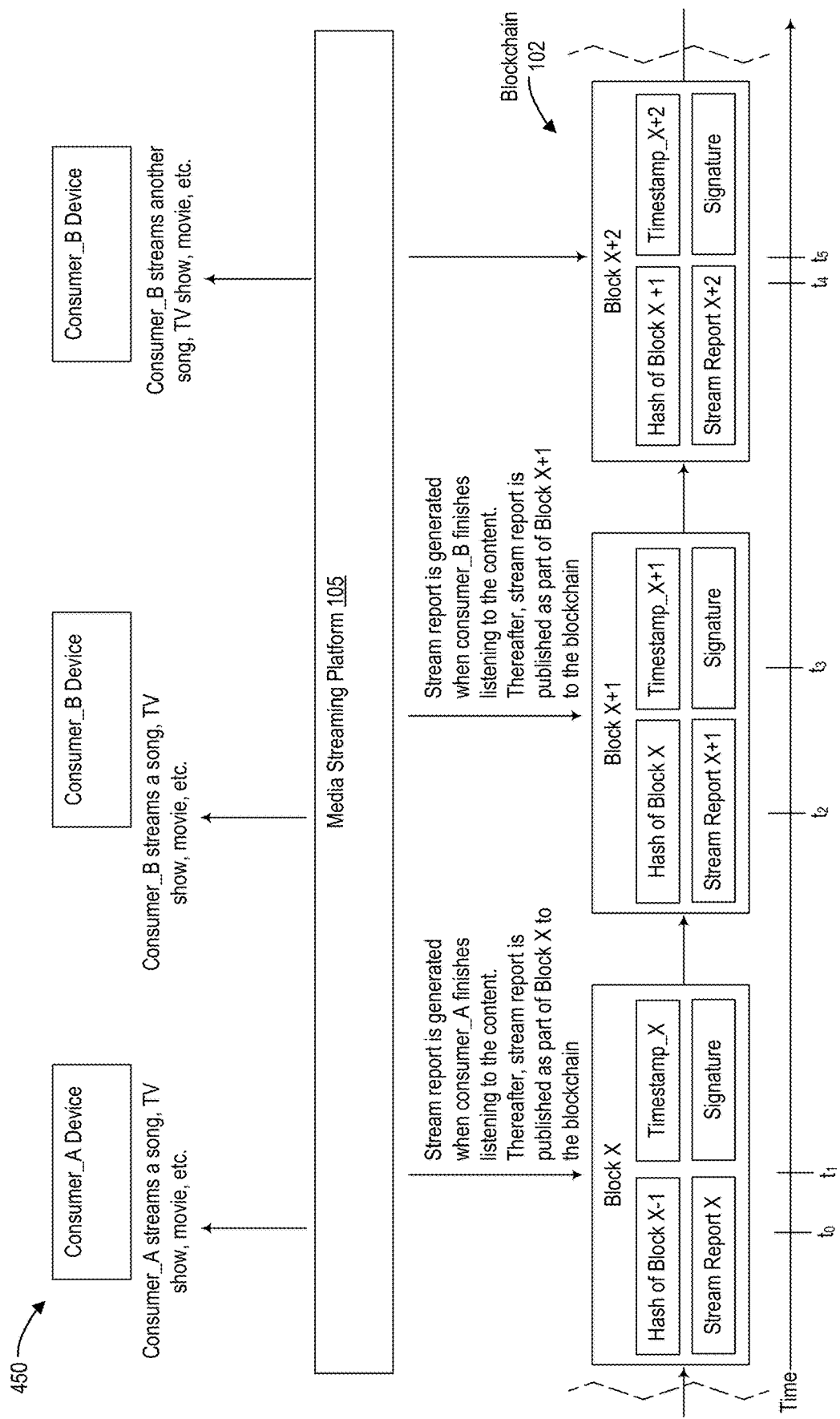
FIG. 4B shows a block diagram of an example portion of a blockchain utilized for reporting media content streaming, such as the blockchain of FIG. 1-3, in accordance with an embodiment of the present disclosure.

As shown in FIGS. 4A and 4B, when a consumer streams a song, movie, TV show, or other type of media content this stream may be reported to the blockchain as a part of a block of the blockchain. That is, the stream is included within a block of the blockchain. In particular, the stream may be reported in a stream report that may include various pieces of streaming information such as: the smart contract reference number of the content (e.g., song, movie, TV show) streamed which may include the title of the content streamed (e.g., the name of a song, title of the movie, etc.), the blockchain account username of the user who streamed the content which provides the identity of the user who streamed the content, the blockchain account/username of the content producer who created the streamed content which provides the identity of the content producer, the duration for which the user streamed the content, as well as the portion of the content streamed (which may include where the user began streaming the content and at what point did the user end streaming of the content, for example, at what time point in a song or video did the user begin streaming and at what time point in the song or video did the user cease streaming). Thus, in some examples, each stream may be reported to the blockchain individually.

However, in another example, the consumers' streaming may be reported to the blockchain at less regular intervals. In particular, the consumer's streaming history may be compiled over a duration, and then all the content streamed by the consumer over that duration may be reported to the blockchain together in a single list, rather than each stream being individually reported to the blockchain separately. Thus, the stream report may comprise more than just one stream. In some examples, the streaming platform may be responsible for compiling these bibliographic stream reports and reporting them to the blockchain.

Figure 5:
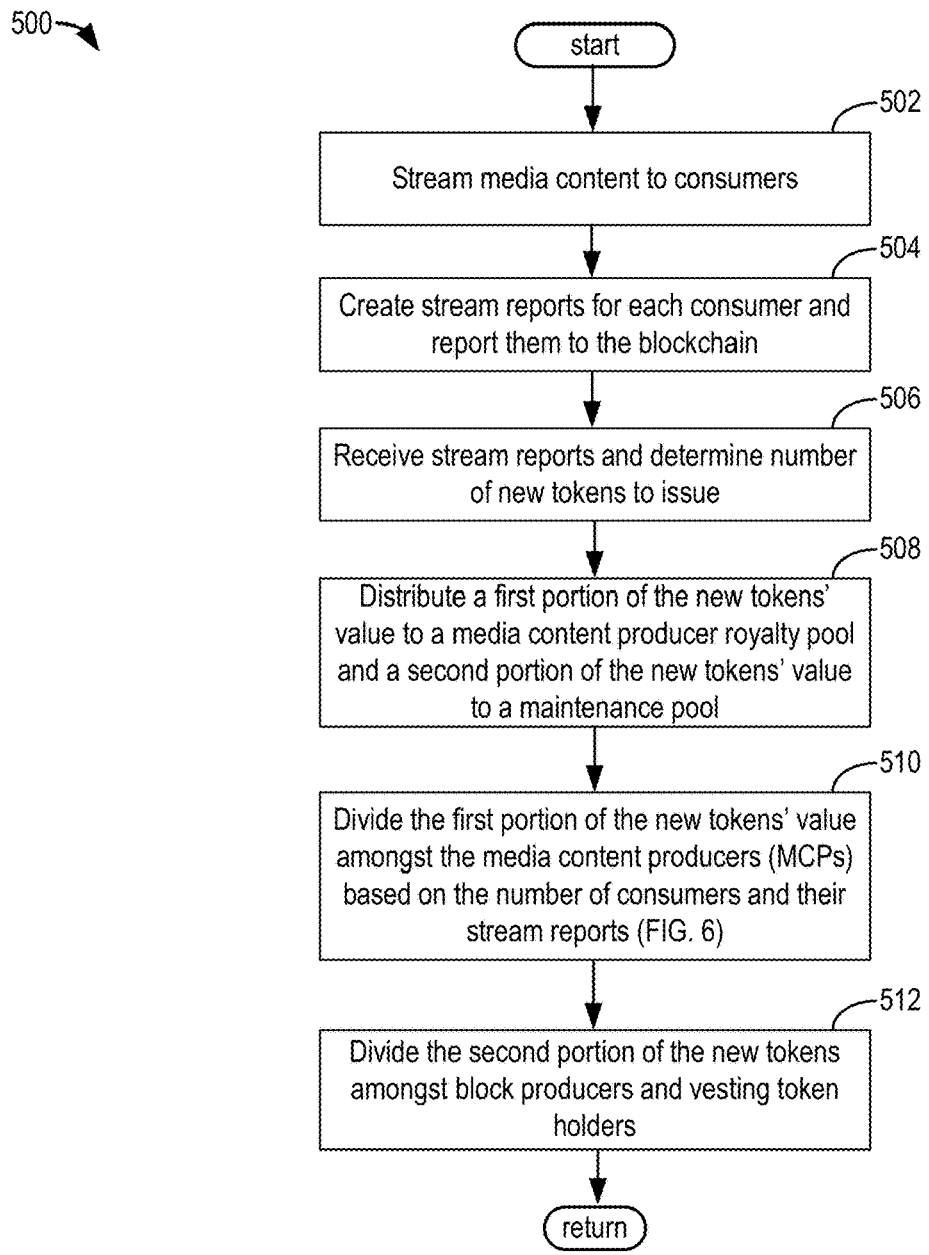
FIG. 5 shows a flow chart of an example method for paying media content producers using a blockchain, such as the example blockchain shown in FIGS. 1-3, in accordance with an embodiment of the present disclosure.
Figure 6:
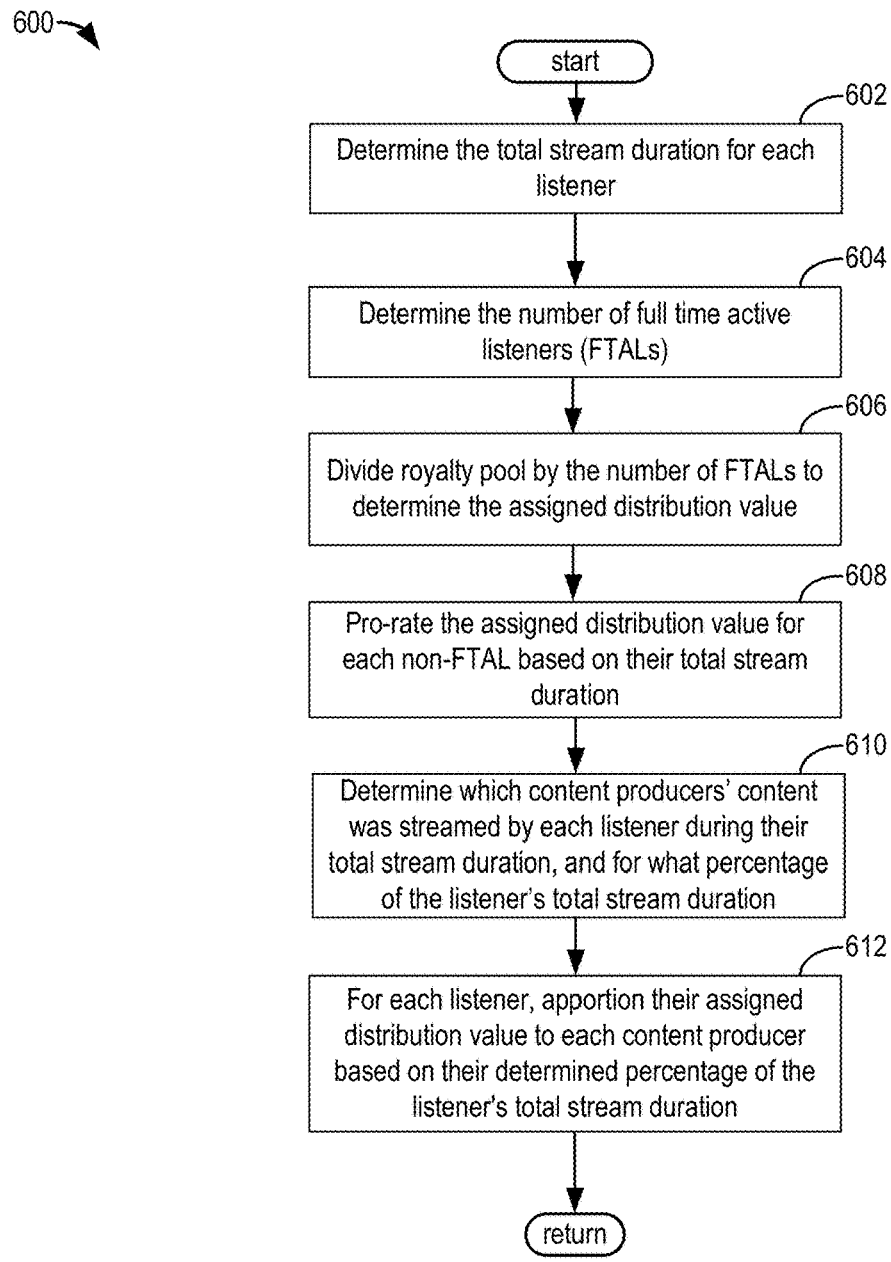
FIG. 6 shows a flow chart of an example method for splitting a royalty payment amongst a pool of media content producer, in accordance with an embodiment of the present disclosure.

As described in the example methods of FIGS. 5 and 6, the various media content producers may then be paid by the blockchain through the steady inflation of the blockchain's tokens. In particular, a portion of new tokens may be issued/distributed to media content producers based on how much their content was streamed. This may in turn be determined based on the various consumers' stream reports.

Thus, consumers' streaming history is validated and confirmed by the blockchain. In this way, the security and incorruptibility offered by blockchain technology can be harnessed to generate a complete and accurate accounting of consumers' streaming on one or more streaming platforms. This verified accounting scheme, when used in combination with an inflation mechanism built into the blockchain's tokens, offers a way to pay media content producers, not through consumers' wallets, but through the blockchain itself, in a way that accurately reflects how much time the media content producers' content was actually streamed.

Figure 1:
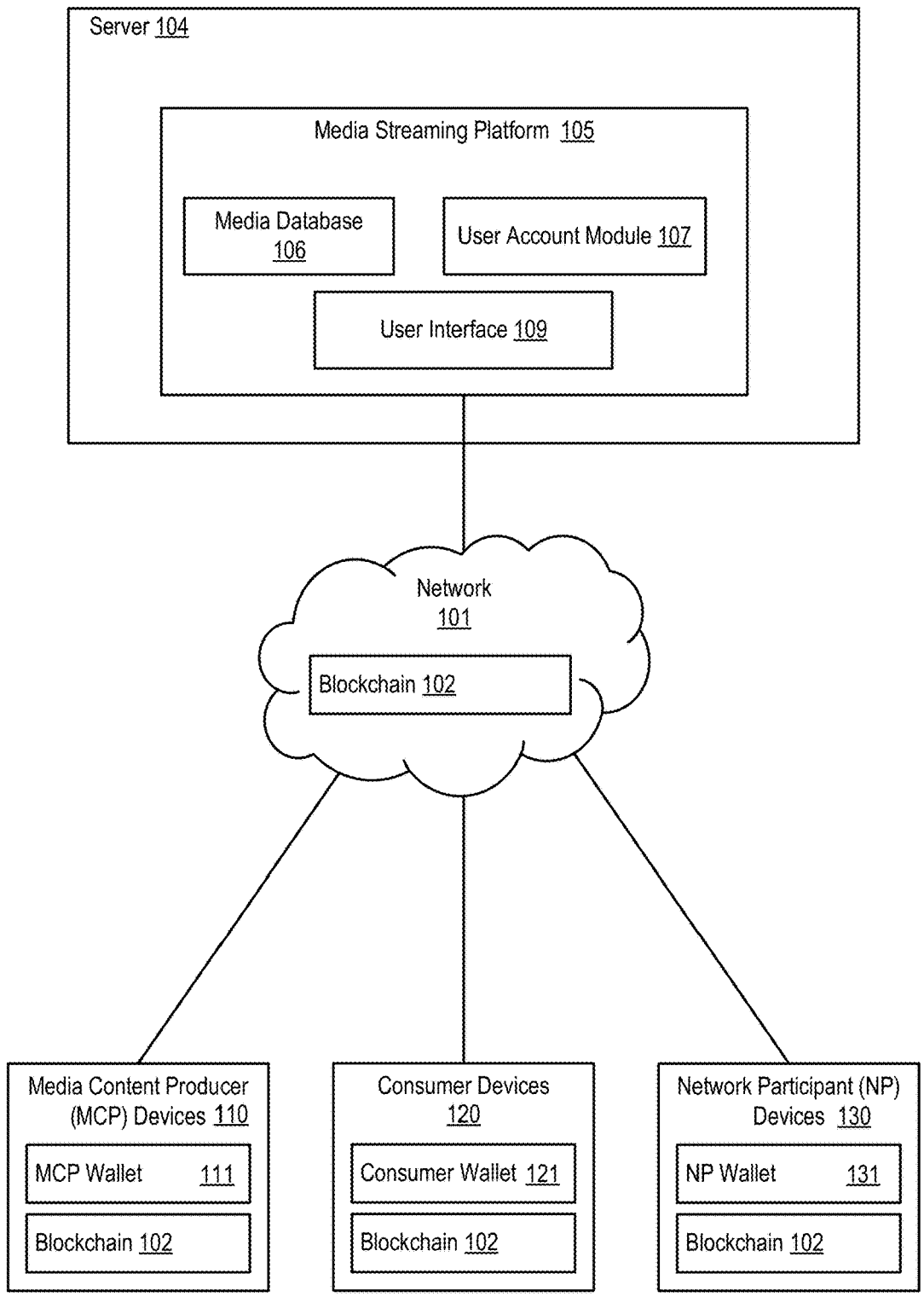
FIG. 1 shows a high-level illustration of an example online media marketplace that uses a blockchain to pay media content producers, in accordance with an embodiment of the present disclosure.
Figure 2:
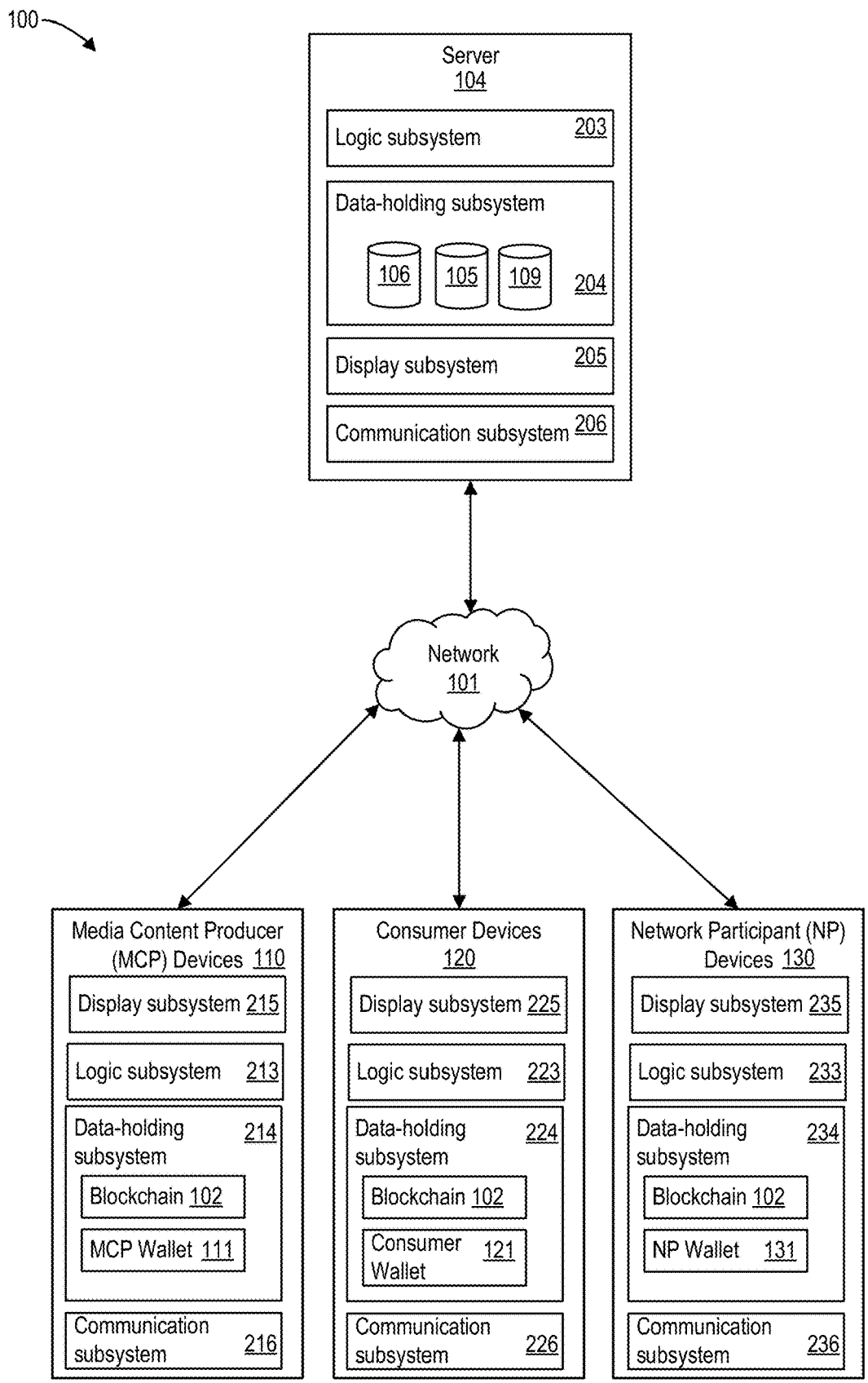
FIG. 2 illustrates an overview of another embodiment of the online media marketplace shown in FIG. 1, in accordance with an embodiment of the present disclosure.

FIGS. 1 and 2, show example computing devices and their hardware that can support and run the above mentioned media streaming system. In particular, FIGS. 1 and 2 show the hardware of the various computing devices that may support a blockchain 102, network 101, and media streaming platform 105.

FIG. 1 shows a high-level block diagram of an embodiment of an online media marketplace 100 that employs a network 101 of communicatively coupled devices that support a blockchain 102. The online media marketplace 100 may allow consumers to stream media content while the content producers may be paid via inflation of the blockchain's tokens.

Thus, a plurality of content producers and consumers may participate in the online media marketplace 100. Media content producers may upload their media content to various media streaming platforms, and consumers may stream the media content through the streaming platforms. These streams may be reported to, and verified by, the blockchain 102, which serves as a public ledger for recording these streams. In other words, the blockchain 102 maintains an active accounting of all the consumers' streams. The blockchain 102 itself may be maintained by various network participants such as miners and vesting token holders. These network participants may comprise the nodes of the blockchain 102.

The online media marketplace 100 may include one or more servers that operate the one or more media content streaming platforms, and a plurality of user devices through which the network participants, consumers, and media content producers may interact with the online media marketplace 100. In the example of the online media marketplace 100 shown in FIG. 1, only one media content producer device 110, one consumer device 120, and one network participant device 130 are shown for simplicity. However, it is important to note that the online media marketplace 100 comprises a plurality of media content producer (MCP) devices 110, consumer devices 120, and network participant (NP) devices 130. Further, although described separately, the different devices may not necessarily be distinct. For example, a network participant may also be a consumer. In particular, the network participant device 130 may mine new blocks in the blockchain and/or may vest tokens, but may also stream media content like a consumer device 120. Thus, the devices are shown separately to illustrate the different actions these devices may perform, but it should be appreciated that there may be overlap between the actions these devices perform.

In the description herein, a media content producer may be defined as an individual, or a group of individuals that compose, perform, produce, or otherwise help create media content. Media content may be defined herein as one or more of: music (e.g., songs), TV shows, movies, etc. Thus, the media content producers may include artists, production companies, producers, actors, writer, composers, lyricists, publishers, and record labels.

A media content producer may upload media content (such as a song) to a server 104 running a media streaming platform 105 via a network 101. In particular, the media content producer may upload a media file containing the media content. For example, a music artist may upload a music audio file to the server 104. Further, the artist may upload album cover artwork, or other image data associated with the media content.

The metadata for the media content may be stored on the blockchain. For example, a smart contract for each piece of media content (e.g., each song) may be stored on the blockchain, and then read by the server 104. That is, the media content producer may create a smart contract for each piece of media content it uploads to a given media streaming platform that is stored on the blockchain. Thus, for example, smart contracts may be formed for each song the media producer uploads to the media streaming platform. Thus, a media content producer may upload media content to their devices 110, and that media content may then be stored on a media database 106 of the media streaming platform 105 of the server 104. MCP devices 110 may be any computing devices configured to access a network such as network 101, including but not limited to personal computers, laptops, smartphones, tablets, and the like.

In the example shown in FIG. 1, the server 104 comprises a single music media streaming platform 105 comprising a single media database 106, however, in other examples, online media marketplace 100 may comprise more than one server 104, and each server 104 may comprise more than one media streaming platform 105, and/or more than one media database 106. The server 104 may comprise a user interface 109. In some examples, the user interface 109 may include one or more physical, non-transitory devices configured to hold data and/or instruction for generating displays to be presented to content producers on their MCP devices 110. Thus, the user interface 109 may comprise computer readable instructions and/or data for running and/or generating one or more of a mobile app, a software program, and a web page. Said another way, the computer readable instructions that run and generate one or more of a mobile app, software program, and web page may be stored in non-transitory memory on the user interface 109. In some examples, therefore, the user interface 109 may be a mobile app. In other examples, the user interface 109 may be a software program. In still further examples, the user interface 109 may be a web page that may be accessed from the MCP devices 110 through a web browser such as Firefox, Safari, Google Chrome, etc.

As such, the user interface 109 may comprise computer readable instructions for generating displays on the MCP devices 110. Therefore, media content producers may interact with the one or more of a mobile app, web page and/or software program, through the displays generated on their MCP devices 110. The user interface 109 may enable MCPs to upload their songs or other media content to the server 104.

Consumers may access the media streaming platform through their consumer devices 120 and may stream and/or download songs stored on the media database 106. In the description herein, a consumer may be defined as any individual that interacts via the user interface 109 and streams and/or downloads media content stored on the media database 106. As such, consumers may be individuals that do not upload songs to the media database 106. The consumers may interact with the user interface 109 via a consumer device 120 that may be in wireless and/or wired communication with server 104 via network 101. Consumer device 120 may be any computing device configured to access a network such as network 101, including but not limited to a personal computer, a laptop, a smartphone, a tablet, and the like. The user interface 109 may be a web page that may be accessed from the consumer device 120 through a web browser such as Firefox, Safari, Google Chrome, etc. As such, the user interface 109 may comprise computer readable instructions for generating displays on the consumer devices 120. Therefore, a consumer may interact with one or more of a mobile app, web page and/or software program, through the displays generated on their consumer device 120. The user interface 109 may enable a consumer download media content from the media streaming platform 105. As such, the consumer may search for, view, stream, download, and listen to media content stored on the media database 106 via the user interface 109.

In this way, consumers may access the media streaming platform 105 (which may be presented in the way of a mobile app, for example) and may stream media content from this media streaming platform. Thus, the media streaming platform 105 comprises software instructions stored in non-transitory memory of the server 104 that stores media content (media database 106) and presents various displays to the consumers (user interface 109) in the form of a mobile app, for example.

In some examples, network 101 may be the public Internet. In further examples, network 101 may be regarded as a private network connection and may include, for example, a virtual private network or an encryption or other security mechanism employed over the public Internet.

As shown in greater detail below with reference to FIGS. 3-4B, the inflation of the blockchain's tokens may be used to pay media content producers whose content was streamed by the consumer devices 120. As described in greater detail below in FIGS. 4A and 4B, consumers' streaming may be verified by all of the devices 110, 120, and 130 connected to network 101. Further, these streams may be recorded on the blockchain 102.

The blockchain 102 is a public ledger that comprises a record of stream reports. The stream reports comprise streaming information such as the content that was streamed, the producer of the content, the user/device which streamed the content, and the duration for which the content was streamed. As stated above, the stream reports on the blockchain 102 are independently verified by the network participant devices 130. In particular, the block producers (e.g., miners or mining devices) validate the content of the blockchain. In some examples businesses that desire to validate the blockchain data themselves instead of trusting a third party to report for them may also verify the stream reports.

In some examples, each of the devices 110, 120, and 130 may have a copy of the blockchain 102 stored in non-transitory memory. Further, the blockchain 102 may expand, as consumers continue to stream media content. After preset time intervals, new blocks in the blockchain 102 may be published to the blockchain, and may be available to each of the devices 110, 120, and 130 via the network 101. In some examples, the time intervals may be microseconds. As such, in some examples the generation of blocks in the blockchain 102 may be approximately automatic. In other examples, the time intervals may be seconds. In particular, the time interval may be approximately three seconds. Transactions may propagate throughout the network in millisecond. In still further examples, the time intervals may be minutes.

Thus, after the pre-set time intervals (e.g., 3 seconds) since the most recent creation of a block, a new block may be created in the blockchain 102 that contains all of the streaming reports that occurred during that time interval since the most recent block. Each block in the blockchain 102 may comprise streaming information for one or more consumer devices 120. Thus, in some example, all streams that occur during the time intervals between sequential blocks may be recorded in the subsequent block of the blockchain 102, which may be stored on each device 110, 120, and 130 in the online media marketplace 100. Said another way, stream reports are parts of each new block in the blockchain 102.

In other embodiments, only a portion of devices on the network 101 may comprise a complete record of the blockchain 102. In still further embodiments, the server 104 may comprise a complete record of the blockchain 102.

The blockchain 102 itself may initially be written as a series of software instructions by one of the devices on the network 101, such as one of the NP devices 130 or the server 104. The software instructions may include computer code for defining how the blockchain functions, for example, how often blocks are published to the blockchain 102, how often tokens are generated, the inflation rate of the tokens, voting rules and governance rules of the blockchain 102, vesting rules, mining rules, etc. Thus, the blockchain 102 may initially be constructed by one or more devices on the network 101, added to the network 101, downloaded by the various devices on the network 101, and then maintained by all of the devices (nodes) on the network 101.

In one example the blockchain may initially be launched with a genesis block (block 0 in the blockchain) containing multiple accounts already created, each with tokens pre-assigned to them. Token holders may then elect their block producing nodes (miners) with stake-weighted votes. The token inflation rate may be pre-set at a particular rate. In some examples, this rate may be approximately 4.75% yearly. Thus, new tokens are created every time new a new block is created (e.g., every 3 seconds).

Thus, the systems and methods described herein with reference below to FIGS. 3-6 may be stored as computer readable instructions stored in non-transitory memory of the various devices on the network 101. That is, the methods described herein with reference below to FIGS. 3-6 may comprise the blockchain 102. That is, the software instructions by which the blockchain 102 operates are described herein with reference to FIGS. 3-6 in block diagrams and flow charts.

Both MCPs and consumers may create user accounts, which may be stored on a user account module 107 on the server 104. The user account module 107 may include a list of user preferences, and/or a history of user activity such as which content the user has streamed.

The blockchain 102 includes at least one type of token. In some example, the blockchain may comprise a utility token that is distributed to block producers and vesters, and a stable media content token that is distributed to media content producers. The value of the blockchain's utility token itself may be maintained and/or stabilized by the network participant devices 130. In one example, the blockchain may comprise a delegated proof-of-stake (DPOS) blockchain in which the blockchain contains no nonce, and thus there is no cryptographic math equation for the block producers to solve. Instead, token holders may elect block producers and may entrust these block producers to add all transactions to a block in the blockchain on their given turn. The token holders may vote out block producers who fail to add transactions to a block on their given turn, and thus may lose their salary (block rewards).

However, in another example, the blockchain may comprise a proof-of-work (POW) blockchain in which the NP devices 130 may mine new blocks in the blockchain to receive the utility token (solve cryptographic mathematical equations to receive the utility token) and/or vest the utility token.

Vesting the utility token comprises freezing the token for a duration, such that token cannot be sold. In some examples, the tokens may be frozen for approximately 13 weeks during the vesting.

The devices 110, 120, and 130 may include wallets 111, 121, and 131, respectively that may hold currency and/or cryptocurrency. In particular, the NP devices 130 may include the utility token in the wallet 131, since the NP devices 130 may be awarded the utility token for mining and/or vesting the utility token. This utility token may be volatile and its value may be subject to market changes. Conversely, the MCP devices 110 may be paid using the stable media content token of the blockchain 102, whose value is not volatile like the utility token. Thus, the MCP devices 110 may include a stable, non-volatile token in the wallet 111. These, stable tokens may therefore act as a promissory note for a certain amount of money (e.g., in dollars). Media content producers may convert the stable token to a utility token and vest that token if they desire to have influence within the network.

Further, the smart contracts that the media content producers form when they upload their content to the platform 105 may link each piece of media content to the wallets 111 of the media content producers who uploaded the content. In this way, the royalty payment may be properly distributed to the media content producer wallets 111 when the royalties are split.

The MCPs may create a smart contract for each piece of media content via an app or browser. In particular, the smart contract may include all relevant information pertaining to a piece of media such as the title of the song. The MCPs may enter all this relevant information, including which user-names are to be paid when the smart contract is contained within a stream report, and this smart contract may then be stored on the blockchain itself.

Turning now to FIG. 2, another example embodiment of the online media marketplace 100 of FIG. 1 is shown. As such, components of the online media marketplace 100 already described in FIG. 1, may not be described again in detail in the description of herein of FIG. 2. Specifically, FIG. 2 shows components of the server 104, and the devices 110, 120, and 130 in more detail.

FIG. 2 is a high level block diagram illustrating the online media marketplace 100 suitable for the streaming and/or downloading media content, and for paying media content producers through inflation of the blockchain's tokens. In particular, online media marketplace 100 includes server 104, media content producers' devices, 110, consumer devices 120, network participant devices 130, and network 101. However, not all of the components illustrated may be required to practice the invention. Variations in the arrangement and type of the components may be made without departing from the spirit or scope of the invention.

Server 104 may be a computing device configured to generate a user interface through which consumers can stream and/or download media content, and where a record of such streaming is stored on the blockchain 102. In different embodiments, server 104 may take the form of a mainframe computer, server computer, desktop computer, laptop computer, tablet computer, home entertainment computer, network computing device, mobile computing device, mobile communication device, gaming device, etc.

Server 104 may include a logic subsystem 203 and a data-holding subsystem 204. Server 104 may optionally include a display subsystem 205, communication subsystem 206, and/or other components not shown in FIG. 2. For example, server 104 may also optionally include user input devices such as keyboards, mice, game controllers, cameras, microphones, and/or touch screens.

Logic subsystem 203 may include one or more physical devices configured to execute one or more instructions. For example, logic subsystem 203 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 203 may include one or more processors that are configured to execute software instructions. Additionally or alternatively, the logic subsystem 203 may include one or more hardware or firmware logic machines configured to execute hardware or firmware instructions. Processors of the logic subsystem 203 may be single or multi-core, and the programs executed thereon may be configured for parallel or distributed processing. The logic subsystem 203 may optionally include individual components that are distributed throughout two or more devices, which may be remotely located and/or configured for coordinated processing. For example, the logic subsystem 203 may include several engines for processing and analyzing data. These engines may include a test evaluator engine, user comment engine, user review engine, user feedback engine, etc. These engines may be wirelessly connected to one or more databases for processing data from the databases. One or more aspects of the logic subsystem 203 may be virtualized and executed by remotely accessible networked computing devices configured in a cloud computing configuration.

Data-holding subsystem 204 may include one or more physical, non-transitory devices configured to hold data and/or instructions executable by the logic subsystem 203 to implement the herein described methods and processes. When such methods and processes are implemented, the state of data-holding subsystem 204 may be transformed (for example, to hold different data). For example, the data-holding subsystem may comprise the media database 106, and/or the user interface 109. Thus, the data-holding subsystem 204 may include non-transitory memory with computer readable instructions for generating displays to be displayed on the media content producers devices 110 and consumer devices 120. Further, the data-holding subsystem 204 may include non-transitory data relating to one or more songs or other media content of the media content producers. As such, the state of the media database 106 may be transformed as new songs and media content are received by the server 104 from the media content producers devices 110.

Data-holding subsystem 204 may include removable media and/or built-in devices. Data-holding subsystem 204 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 204 may include devices with one or more of the following characteristics: volatile, nonvolatile, dynamic, static, read/write, read-only, random access, sequential access, location addressable, file addressable, and content addressable. In some embodiments, logic subsystem 203 and data-holding subsystem 204 may be integrated into one or more common devices, such as an application-specific integrated circuit or a system on a chip.

It is to be appreciated that data-holding subsystem 204 includes one or more physical, non-transitory devices. In contrast, in some embodiments aspects of the instructions described herein may be propagated in a transitory fashion by a pure signal (for example, an electromagnetic signal) that is not held by a physical device for at least a finite duration. Furthermore, data and/or other forms of information pertaining to the present disclosure may be propagated by a pure signal.

When included, display subsystem 205 may be used to present a visual representation of data held by data-holding subsystem 204. As the herein described methods and processes change the data held by the data-holding subsystem 204, and thus transform the state of the data-holding subsystem 204, the state of display subsystem 205 may likewise be transformed to visually represent changes in the underlying data. Display subsystem 205 may include one or more display devices utilizing virtually any type of technology. Such display devices may be combined with logic subsystem 203 and/or data-holding subsystem 204 in a shared enclosure, or such display devices may be peripheral display devices.

When included, communication subsystem 206 may be configured to communicatively couple server 104 with one or more other computing devices, such as consumer devices 120, NP devices 130, and/or media content producers devices 110. Communication subsystem 206 may include wired and/or wireless communication devices compatible with one or more different communication protocols. As non-limiting examples, communication subsystem 206 may be configured for communication via a wireless telephone network, a wireless local area network, a wired local area network, a wireless wide area network, a wired wide area network, etc. In some embodiments, communication subsystem 206 may allow server 104 to send and/or receive messages to and/or from other devices via a network such as the public Internet. For example, communication subsystem 206 may communicatively couple server 104 with consumer devices 120, NP devices 130, and/or media content producers devices 110 via network 101. In some examples, network 101 may be the public Internet.

Consumer devices 120, MCP devices 110, and NP devices 130 may include various hardware for storing software instruction, processing data and input, and executing the software instructions responsive to said inputs. In particular, the devices 120, 110, and 130 may include logic subsystems, and data-holding subsystems. As such, they may collectively be described herein for the sake of brevity.

The devices 110, 120, and 130 may include logic subsystems 213, 223, and 233, respectively, and data-holding subsystems 214, 224, and 234, respectively. The devices 110, 120, and 130 may optionally include display subsystems 215, 225, and 235, respectively and/or communication subsystems 216, 226, and 236, respectively, and/or other components not shown in FIG. 2. For example, the devices 110, 120, and 130 may also optionally include user input devices such as keyboards, mice, game controllers, cameras, microphones, and/or touch screens.

Logic subsystems 213, 223, and 233 may include one or more physical devices configured to execute one or more instructions. For example, logic subsystems 213, 223, and 233 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystems 213, 223, and 233 may include one or more processors that are configured to execute software instructions. Additionally or alternatively, the logic subsystems 213, 223, and 233 may include one or more hardware or firmware logic machines configured to execute hardware or firmware instructions. Processors of the logic subsystems 213, 223, 233 may be single or multi-core, and the programs executed thereon may be configured for parallel or distributed processing. The logic subsystem 223 may optionally include individual components that are distributed throughout two or more devices, which may be remotely located and/or configured for coordinated processing. One or more aspects of the logic subsystems 213, 223, and 233 may be virtualized and executed by remotely accessible networking computing devices configured in a cloud computing configuration.

Data-holding subsystems 214, 224, and 234 may include one or more physical, non-transitory devices configured to hold data and/or instructions executable by the logic subsystems 213, 223, and 233 to implement the herein described methods and processes. When such methods and processes are implemented, the state of data-holding subsystems 214, 224, and 234 may be transformed (for example, to hold different data). As such, data-holding subsystems 214, 224, and 234 may include blockchain 102, and the wallets 111, 121, and 131. When a new block on the blockchain 102 is published, the state of data-holding subsystems 214, 224, and 234 (specifically the blockchain 102), may be transformed, so that the new block in the blockchain 102 is incorporated in the data held in the data-holding subsystems 214, 224, and 234.

Data-holding subsystems 214, 224, and 243 may include removable media and/or built-in devices. Data-holding subsystems 214, 224, and 234 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystems 214, 224, and 234 may include devices with one or more of the following characteristics: volatile, nonvolatile, dynamic, static, read/write, read-only, random access, sequential access, location addressable, file addressable, and content addressable. In some embodiments, logic subsystems 213, 223, and 233 and data-holding subsystems 214, 224, and 234 may be integrated into one or more common devices, such as an application-specific integrated circuit or a system on a chip.

When included, display subsystems 215, 225, and 235 may be used to present a visual representation of data held by data-holding subsystems 214, 224, and 234. As the herein described methods and processes change the data held by the data-holding subsystems 214, 224, and 234, and thus transform the state of the data-holding subsystems 214, 224, and 234 the state of display subsystems 215, 225, and 235 may likewise be transformed to visually represent changes in the underlying data. Display subsystems 215, 225, and 235 may include one or more display devices utilizing virtually any type of technology. Such display devices may be combined with logic subsystems 213, 223, and 233 and/or data-holding subsystems 214, 224, and 234 in a shared enclosure, or such display devices may be peripheral display devices. Thus, display subsystems 215, 225, and 235 may present a visual representation of the user interface 109.

When included, communication subsystems 216, 226, and 236 may be configured to communicatively couple the devices 110, 120, and 130 with one or more the other computing devices on the network 101. Communication subsystems 216, 226, and 236 may include wired and/or wireless communication devices compatible with one or more different communication protocols. As non-limiting examples, communication subsystems 216, 226, and 236 may be configured for communication via a wireless telephone network, a wireless local area network, a wired local area network, a wireless wide area network, a wired wide area network, etc. In some embodiments, communication subsystems 216, 226, and 236 may allow the devices 110, 120, and 130 to send and/or receive messages to and/or from the other devices, as well as server 104 via network 101 such as the public Internet.

Thus server 104, and devices 110, 120, and 130 may comprise computing devices which may generally include any device that is configured to perform computation and that is capable of sending and receiving data communications by way of one or more wired and/or wireless communication interfaces. Such devices may be configured to communicate using any of a variety of network protocols. For example, devices 110, 120, and 130 may be configured to execute a browser application that employs HTTP to request information from server 104 and then displays the retrieved information to a user on a display.

Figure 3:
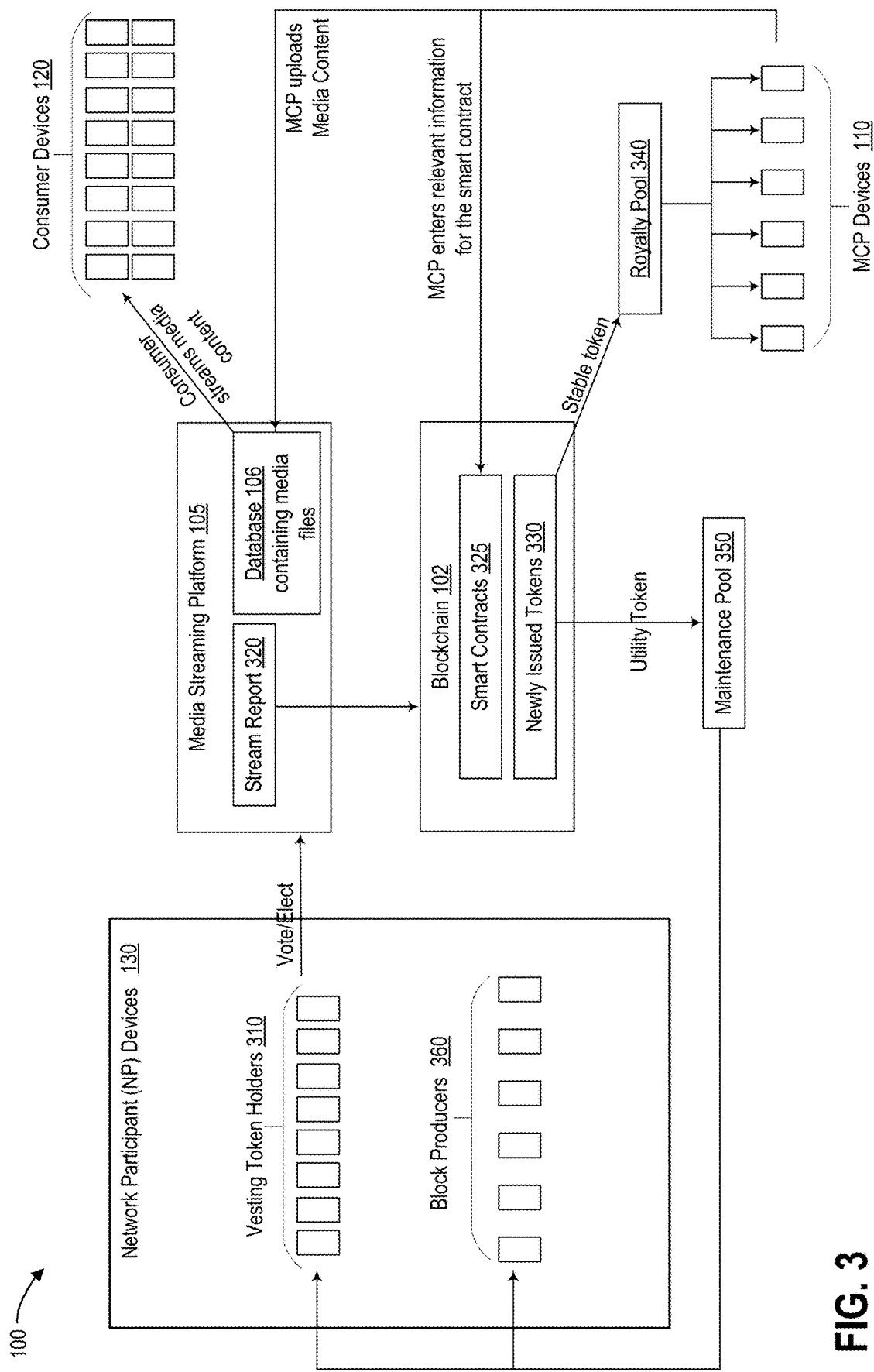
FIG. 3 illustrates another example of the online media marketplace shown in FIG. 1, in accordance with an embodiment of the present disclosure.

Turning to FIGS. 3-4B, they show more detailed examples of how the hardware described above in FIGS. 1-2 may be implemented to run a media streaming service on the blockchain 102, to enable consumers to stream media, while paying media content producers through inflation of the blockchain's tokens.

Focusing on FIG. 3, it shows a block diagram of the online media marketplace 100 in operation. MCPs upload their media files containing the media content to the media streaming platform which may be stored on the database 106. The MCPs also create a smart contract that is stored on the blockchain 102 with other smart contracts 325 by entering the relevant information pertaining to each piece of media content (e.g., smart contract identifier, username/blockchain identifier associated with the MCP, etc).

Consumers may then stream the media content. That is, the media content is streamed to the consumer devices 120, and in exchange for the streaming, tokens 330 are issued as payment to the MCP devices 110. Further, NP devices 130 are also issued tokens 330 for maintaining and securing the blockchain 102 and value of the tokens 330.

One or more of the consumer devices 120 may stream media content from the media streaming platform 105. A stream report 320 is created responsive to this streaming that is reported to the blockchain 102. In particular, the media streaming platform 105 may read the smart contract 325 from the blockchain 102 associated with the streamed content, and may then may use the information stored in that smart contract 325 to create the stream report 320, that is then reported to the blockchain as a transaction.

As described in greater detail below with reference to FIGS. 4A and 4B, the smart contract may include information such as the smart contract identifier (e.g., title name of the media content), and the username/blockchain identify of the media producer that produced the media content. The stream report may include this information, and may additionally include the username/blockchain of the listener who streamed the content, and the duration for which the listener streamed the content.

The stream report may be reported to the blockchain as part of a block, and may include additional information such as a timestamp, nonce (only if the blockchain is a proof-of-work blockchain), and previous hash. However, in other examples, multiple streams may be reported together in the same block. Thus, the block may include multiple stream reports, especially when the blocks are created at lower frequencies (with longer time intervals between blocks).

In some examples, a stream report 320 may be created for each individual stream. Thus, once a consumer finishes streaming a single piece of media content (e.g., a single song, a single TV show, etc.) that one stream may be reported to the blockchain 102. However, in other examples, the stream report 320 may be created for each of the consumer devices 120, over a duration (e.g., a 24 hour period), and may include a list of all the streams for each of the consumer devices 120 during that duration.

In yet further examples, each block in the blockchain may include more than one stream report. That is each block in the blockchain may not only include a record of multiple streams from a given consumer device, but may also include a record of multiple streams from multiple consumer devices. In some examples, each block in the blockchain may include all of the streams, from all of the consumer devices that stream content since the most recent block in the blockchain. Thus, each block in the blockchain may contain a record of all media content streamed by the various consumer devices 120 since the last block in the blockchain was created.

Since these stream reports are reported as part of blocks in the blockchain 102, all of the streams must be verified by the various nodes (e.g., devices 110, 120, and 130 described above in FIGS. 1-2) of the blockchain 102. In this way, by using smart contracts to stream media content to consumers, the actual media that is streamed, the user/device it is streamed by, and the duration for which it is streamed can be confirmed, verified, and authenticated via the distributed ledger of the blockchain 102.

As such, the accuracy of streaming reporting may be increased. In particular, since the streaming information is publicly reported and available on the blockchain, media content producers may review how their content has been streamed by consumers, and verify that the royalty payments they are receiving are accurate. In particular, because the blockchain prevents the streaming information from being altered once it has been added to the blockchain, media content producers can not only track their royalty payments, but can also get more accurate and complete feedback on how their content is being received and consumed. In particular, media content producers can look on the blockchain to see on which streaming platforms they are most popular, how their streams have changed over time, if people who stream their work view/listen to the media content in entirety, or just part of a it, and even determine which parts/sections of their works correlate with viewership/listenership drops. Further, media content producers may receive more immediate payments. In particular, the royalties may be paid out every 24 hours in some examples.

The blockchain 102 may comprise its own cryptocurrency in the form of tokens. In particular, the blockchain 102 may comprise a volatile utility token and a stable, royalty token (also referred to herein as the "stable, media content token"). The circulating supply for these tokens gradually increases. That is, the number of tokens inflates and grows over time. Thus, newly issued tokens 330 are periodically generated and issued to various devices/nodes on the network. A first portion of the newly issued tokens 330 may be issued to the NP devices 130 for maintaining the Blockchain 102 and stabilizing the value of the tokens. These tokens may comprise a first token, or utility token. In particular, some of the newly issued tokens 330 may be issued to a maintenance pool 350 comprising the NP devices 130. The tokens in the maintenance pool 350 may then be distributed amongst vesting token holders 310 and block producers 360. In some examples, a vesting token holder may also be a block producer (a user my both mine new blocks in the blockchain, and hold vested tokens). The block producers 360 comprise computing devices that report the transactions/stream reports that occurred since the most recent block. The block producer may then digitally/cryptographically sign each block to validate these transactions were witnessed by the block producer. The block producers 360 may receive tokens for verifying blockchain transactions (both token transactions, as well as stream reports), and the vesting token holders 310 comprise computing devices/wallet addresses wherein tokens are vested, thus stabilizing the price of said tokens.

In some examples, the blockchain 102 may include instructions for how to distribute the tokens 330 amongst the block producers 360 and vesting token holders 310. As described above with reference to FIG. 1, instructions on the blockchain 102 may be written into the blockchain 102 at its inception. Further, the codebase of the blockchain may be upgraded and changed upon approval from a majority of nodes (devices) on the network. For example, the blockchain 102 may determine pre-set apportionment percentages that dictate how the newly issued tokens 330 are to be apportioned. For example, these pre-set apportionment percentages may dictate that block producers 360 receive a first percentage of the newly issued tokens 330, and that vesting token holders 310 receive s second percentage of the newly issued tokens 330. In some examples, the maintenance pool 350 may comprise approximately half of the newly issued tokens 330. In further examples, block producers 360 may receive approximately one third of the tokens in the maintenance pool 350 and the vesting token holders 310 may receive approximately two thirds of the tokens in the maintenance pool. However, these pre-set apportionment percentages may be adjusted by the block producers via a consensus voting mechanism/consensus algorithm, wherein the consensus voting mechanism or consensus algorithm may comprise proof of work, proof of stake, or other conventionally known consensus algorithms. That is, the block producer may propose new parameters to the chain to adjust the apportionment percentages. In one example, for the new parameter to be implemented, a majority of the block producers must approve the changes, and these block producers must be elected by token holders. In another example, suggested changes to the codebase of the blockchain 102 may be implemented upon a pre-determined threshold of votes in favor of the changes from token holders being met or surpassed. In one example, the threshold comprises two thirds of the token holders. In another example, the threshold comprises 75% of the token holders.

The rest of the approximately half of the newly issued tokens 330 are issued to the royalty pool 340, which comprises the various MCP devices 110 whose media content was streamed. These tokens may comprise a second, different token that may also be referred to herein as a stable royalty token. Unlike the utility token, whose value may fluctuate on the open market, these stable royalty tokens may hold their value. In other words, they may represent a fixed dollar amount, for example. In one example, the stable royalty tokens comprise a smart contract which enables a holder of a stable royalty token to exchange the stable royalty token at a future time for a number of utility tokens equal to a fixed USD value, wherein the number of utility tokens may fluctuate in inverse proportion to the fluctuation in the value of the utility token against the USD, or some other fiat currency. In another example, the stable royalty token may be pegged to a government's fiat currency, such as USD, and may be exchanged for a fixed amount of the fiat currency using an exchange. The stable royalty tokens in the royalty pool 340 are apportioned amongst the MCP devices based on how much the media content producers' content was streamed, as described in greater detail below with reference to FIG. 6.

Vesting token holders 310 and block producers 360 (also referred to herein as minders 360) are incentivized to accumulate tokens because possession of the tokens provides several advantages. First, users that have tokens may have voting power on governance of the blockchain 102. For example, these voting powers may include the ability to select block producers, propose codebase changes/upgrades, and select which streaming platforms receive royalty payment subsidies from the blockchain 102. Second, possessing tokens may allow users to write to the blockchain 102. For example, possession of tokens may allow users to upload media content to a streaming platform and create a smart contract, perform a transaction (send funds), make an edit to a description of the media content (e.g., add the name of a lyricist), and send a stream report to the blockchain 102 as an elected streaming platform. Further, a user's reputation score increases with the amount of tokens the user possesses. Thus, the accumulation of tokens leads to a higher reputation score. Listeners with higher reputation scores may receive more perks than listeners with lower reputation scores. For example, listeners with higher reputation scores may not have their media streams paused as often with advertisements, alerts, or other interruptions. Thus, the higher a listener's reputation score, the less they may be interrupted in the middle of their streaming with various alerts, advertisements, etc.

The media streaming platform may also be required to hold a pre-set amount of the utility token for each stream report 320 it generates. Thus, the streaming platforms are also incentivized to hold tokens because holding more tokens allows the streaming platforms to report transactions to the blockchain more frequently and thus pay their content producers more often through the blockchain (through the royalty pool 340), which in turn incentivizes more media producers to share their content on the media streaming platform. For example, the blockchain may only allow the streaming platforms to report a set number of stream reports for each token they have vested. In particular, the maximum number of transactions (stream reports) that are possible on the network per unit time (e.g., per second) may be divided by the number of tokens currently vested on the network to determine how many streams each vested token allows. Thus, the streaming platforms may be limited in how much of their streaming they can offload to the blockchain by how many tokens they have vested.

Continuing to FIGS. 4A and 4B, they show example stream reports that are generated when a listener streams a song. These stream reports are published to the blockchain 102 when the listener finishes streaming the song, and the amount of time the song was streamed is reported. Each stream report is reported as part of a block in the blockchain and includes streaming information regarding the stream. However, it is important to note that each block in the blockchain may include a plurality of stream reports.

FIG. 4A shows an example block diagram 400 of a portion of the blockchain 102, represented for illustrative purposes in the form of a block diagram. The blockchain 102 comprises a plurality of blocks, strung together in a sequence. In the example of FIG. 4A, Block X+1 represents the block recording a stream/smart contract between a first consumer device 402 and the media streaming platform 105.

The first consumer device 402 requests media content to stream from the media streaming platform 105. The first consumer device 402 may comprise one of the consumer devices 120 described above with reference to FIGS. 1-3. The media streaming platform streams the requested content to the consumer device 402, and creates a stream report that is published as a block to the blockchain 102 when the consumer finishes streaming the media content. The streaming platform 105 may read smart contracts 325 from the blockchain 102. In particular, the streaming platform 105 may read the smart contract associated with the requested media content to create a stream report. The smart contract may contain information such as the username/account of the MCP that created the streamed content, for example, that may be reported in the stream report.

Each block in the blockchain includes a hash of the previous block in the blockchain 102, a timestamp, a stream report (e.g., stream report 320 described above in FIG. 3) and a digital signature from a block producer that verifies they witnesses the stream report/transaction.

As described above, the stream report may include the identity of the media content producer whose content was streamed by the first consumer device 402, the identity of the first consumer device 402, and the duration for which the content was streamed. In some examples, the stream report may be created and/or reported to the blockchain 102 when the first consumer device 402 finishes streaming the content. However, in other examples, the stream report may be created when the consumer device 402 finishes streaming the content and may be reported to the blockchain at a later time. The identity of the media content producer may comprise the wallet address corresponding to the media content producer (e.g., wallet 111 described above in FIGS. 1-2). In this way, the blockchain ensures that the royalties are distributed to the correct media content producers.

FIG. 4B shows a similar block diagram 450 that includes a timeline of example block creation/formation in the blockchain 102. FIG. 4B shows only one stream report per block for the purposes of simplicity and clarity. However, it should be appreciated that a plurality of stream reports may be reported to a single block in the blockchain. That is a single block in the blockchain may comprise a plurality of different stream reports.

Beginning at $t_0$, a first consumer_A device may stream a song, TV show, or other single piece of media content. At $t_1$ consumer_A device finishes streaming the content and a stream report may be generated. This stream report may then be reported to the blockchain 102 (in some examples a duration after the consumer has finished streaming the content). In the description herein, the stream may finish/terminate when one or more of the content reaches its end, the consumer stops the content, or the consumer begins streaming a different content.

Then at $t_2$, a different consumer_B device may stream a song, TV show, or other piece of media content. The stream report may then be generated at $t_3$, and may be reported to the blockchain 102 as part of Block X+1. However, the consumer_B device may stream the content for longer than consumer_A device as noted by the longer time delay between $t_2$ and $t_3$ than between $t_0$ and $t_1$. Thus, the duration of the stream reported in the stream report X+1 of Block X+1 may be greater than the duration of the stream reported in the stream report X in Block X.

Consumer_B device may then stream a different song at $t_4$, and may stream the content for a shorter duration than the streams of Block X and Block X+1, and may then terminate the streaming at $t_5$. At $t_5$ therefore, the stream report is generated, and may thereafter be published to the blockchain 102 as part of Block X+2.

Although FIGS. 4A and 4B only show one stream being reported to each block in the blockchain, it is important to note that multiple streams may be reported to a single block in the blockchain in some examples. Further, as described above, the streams of multiple different consumers may be reported in a single block in the blockchain. Thus, each block in the blockchain may comprise a plurality of stream reports from a plurality of different consumer devices. In some examples, each stream report may include one stream or piece of media content (e.g., one song). However, in other examples, each stream report may include several pieces of media content (e.g., multiple songs) for content streamed by a single user.

Thus, by reporting the media streaming using a blockchain, the regularity at which the media streaming is reported may be increased relative to systems that compile streams together over a duration and then report to the producers at long intervals (e.g., every month). Further, by using the blockchain, the stream reports themselves may be much more granular and detailed. That is, each stream report may comprise information relating to just a single stream of media content, allowing a media content producer to see how each individual piece of media content is being streamed, rather than just a report of total stream duration for all their consumers like is offered by other reporting systems. That is, because the blockchain reports the streaming on a more granular level, and more efficiently, media content producers can more quickly see how their content is being received, and can do so more accurately because the reporting is more detailed.

Turning to FIGS. 5 and 6, they show example methods that may be stored as instructions within a blockchain (e.g., blockchain 102 described above) and/or in non-transitory memory of various devices communicatively coupled via a network (e.g., network 101 describe above). Thus, the various devices on the network may collectively perform the example methods by executing instructions/smart contracts stored on a blockchain.

Method 500 begins at 502 which comprises streaming media content to consumers (e.g., consumer devices 120 described above). In particular, 502 may be performed by a streaming service comprising a streaming platform (e.g., streaming platform 105 described above) stored on one or more servers (e.g., server 104 described above).

As described above in FIGS. 3-4B, when the consumer finishes streaming the media content, a stream report is created and thereafter is reported to the blockchain at 504 as part of a block in the blockchain. For example, the streaming platform may generate a smart contract when the media content producer uploads the song to the platform, and then the stream report may be generated when that content is streamed to the consumer and/or when the consumer finishes streaming that content. After the stream report is generated, it may be reported to the blockchain as a block in the blockchain. Thus, the rate of reporting of streams may be limited by the frequency at which blocks are created in the blockchain. That is, stream reports may be generated more frequently than blocks are created. Thus, a plurality of stream reports may be generated during block creation, and then may be reported in a single block once that block is created and published to the blockchain. Method 500 then continues from 504 to 506.

At 506, the blockchain receives the stream reports and determines a number of new tokens to create. For example the blockchain may inflate the number of tokens at a pre-set rate (e.g., 4.75%/year). In other examples, the blockchain may adjust the inflation rate. In some examples, the blockchain may inflate the number of tokens after a threshold number of stream reports have been added to the blockchain. In another example, the blockchain may determine the number of new tokens to create after a threshold number of blocks have been published to the blockchain. In another example, the blockchain may determine the number of new tokens to create after a threshold duration of time has elapsed since the last generation of new tokens. Method 500 then continues from 506 to 508.

At 508, method 500 distributes a first portion of the new tokens' to a royalty pool (e.g., royalty pool 340 described above in FIG. 3) and a second portion of the new tokens to a maintenance pool (e.g., maintenance pool 350 described above in FIG. 3). The first portion of the new token's may comprise stable coins, or fiat currency pinned tokens which do not substantially change in value in time. The media producers in the royalty pool are therefore guaranteed the value of the tokens at the time of issuance, insulating the media producers from changes/fluctuations in the value of the token. In this way, a media producer may still be able to exchange the tokens for equivalent currency at a later time even if the value of the tokens drops, because the media producer is not paid in tokens directly, but in a promissory note for the current value of the tokens on the open market but which is redeemed by the blockchain itself. For example, if a MCP is paid 10 stable royalty tokens, the MCP is guaranteed the dollar equivalent of whatever those royalty tokens are currently worth if converted to utility tokens. For example, if the utility token is currently worth $2, then the MCP is guaranteed $20. Thus, if later the utility token's value crashes to 10 cents, for example, then the MCP would convert the 10 royalty tokens to 200 utility tokens, to ensure that the MCP is still paid their guaranteed $20.

The blockchain may set the first and second portions based on pre-set percentages. For example, the first portion may be approximately 50% and the second portion may be approximately 50%, of the total amount of new tokens produced. Thus, in some examples, the new tokens may be approximately evenly split between the royalty pool and the maintenance pool. However, in other examples, the apportionment between the royalty pool and maintenance pool may be different and in further examples may be adjusted by the blockchain. Method 500 then continues from 508 to 510.

At 510, method 500 comprises dividing the first portion of the new tokens in the royalty pool amongst the media content producers based on the number of consumers and their stream reports as described in greater detail in FIG. 6. Thus, the method of FIG. 6 may be run as a subroutine of method 500 at 510. Thus, method 500 at 510 may include some or all of the actions listed in method 600 of FIG. 6.

Method 500 then continues from 510 to 512. Method 500 comprises dividing the second portion of the new tokens' amongst the block producers and the vesting token holders. As described above in FIG. 3, the blockchain may split the second portion of the new tokens according to a pre-set apportionment formula. For example, the vesting token holders may be given approximately two thirds of the second portion of new tokens, and the block producers (miners) may be given the other third of the second portion of the new tokens. However, much like the apportionment of the first portion in the royalty pool, the apportionment formula may be adjusted by the blockchain, so that the second portion of the new tokens are apportioned differently. Method 500 then returns.

Turning now to FIG. 6, it shows a method 600 that may be performed at 510 of method 500 in FIG. 5, for apportioning token inflation of a blockchain's utility token amongst various content producers whose content was streamed by various consumers/listeners over a duration.

Method 600 begins at 602, which comprises determining the total stream duration for each listener. For example, the method 600 at 602 may comprise compiling all of the stream reports for each listener during the duration. The duration may be a 24 hour period, as one non-limiting example. Since, the stream reports reported to the blockchain include the identity of each consumer/listener, the total stream duration for a given consumer/listener during the duration may be compiled by simply adding together all of the stream durations reported in each of that listener's stream reports. Once the total stream duration for each listener has been calculated, method 600 may continue from 602 to 604.

At 604, method 600 may comprise determining the number of full time active listeners. For example, the number of full time active listeners may be listeners whose total stream duration is greater than a threshold (listeners who listen to content for more than a threshold amount of time during the duration). In some examples, this threshold may be approximately 3600 seconds. Method 600 then continues from 604 to 606.

At 606, method 600 comprises dividing the royalty pool by the number of full time active listeners to determine an assigned distribution value. For example, the blockchain may determine the value of the first portion of newly issued tokens in the royalty pool by multiplying the number of tokens in the royalty pool by the current value of the tokens at the time of issuance. The total value of the tokens in the royalty pool is then divided equally amongst the number of full time active listeners and comprises the assigned distribution value. In other words, each full time active listener is weighted equally when determining how to split royalties to the media producers. That is, each active listener has an equal effect on how the royalties are split amongst the media producers. Method 600 then continues from 606 to 608.

At 608 method 600 comprises pro-rating the assigned distribution value for all listeners that are not full-time active listeners (streamed less than the threshold stream duration) based on their total stream duration. For example, if a listener streamed half of the threshold stream duration, then they would be assigned half of the distribution value. As one example, if the threshold for full time active listener status is 3600 seconds and the assigned distribution value is 2, and the listener streamed for a total of 1600 seconds, then that listener would be assigned a distribution value of 1. As such, listeners that are not full time active listeners have a smaller impact on how the royalties are split than active full time listeners. Method 600 then continues from 608 to 610.

Method 600 at 610 comprises determining which content producers' content was streamed by each listener during their total stream duration, and determining for what percentage of their total stream duration each content producers' content was streamed. Since, the blockchain contains the identity of the media content producers (the address of their corresponding digital wallet), and the duration for which their content was streamed, the blockchain can do the above determining steps by compiling all the streams for each listener and simply dividing the total time listened to a given media producers' content (sum of all media content producers' content streamed by the listener, which could be multiple different pieces of media content) by the listener's total stream duration. Method 600 then continues from 610 to 612.

At 612, method 600 comprises, for each listener, apportioning their assigned distribution value to each content producer based on their determined percentage of the listener's total stream duration. For example, if a given listener listened to 30 songs of the same artist ("artist X") that totaled 1800 seconds, and the listener listened to various artists during the duration cumulating in a total stream duration of 3600 seconds, then half of that listener's assigned distribution value would be assigned to "artist X."

Figure 7:
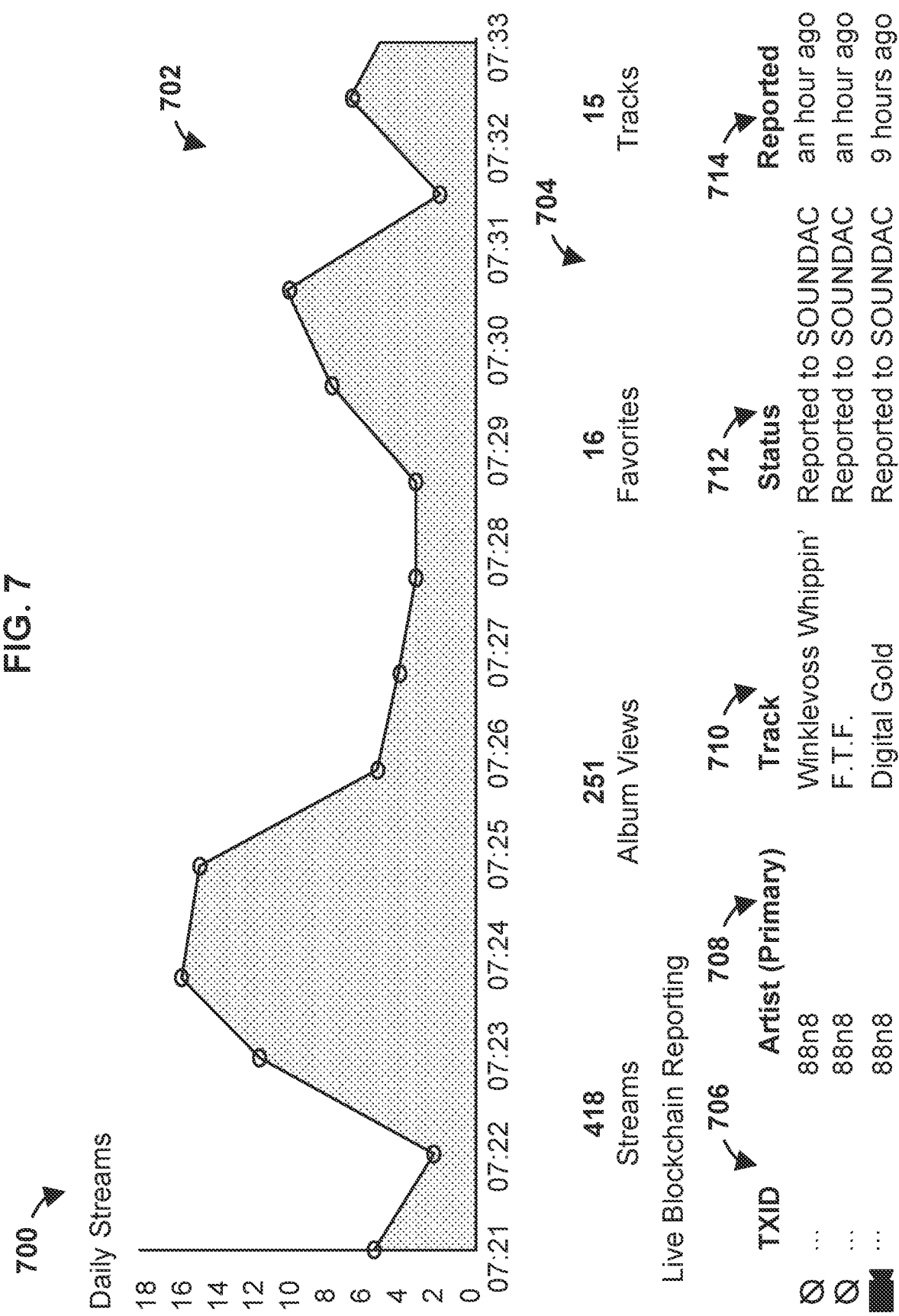
FIG. 7 illustrates an example media content producer device interface, in accordance with an embodiment of the present disclosure.

FIG. 7 shows an example display 700 that may be presented on a media content producer's device showing a media content producer who has streamed their content, what content has been streamed, and for how long. In this way, the MCP can verify that the royalty payment they receive (e.g., that day) is accurate and actually reflects how much their content was streamed.

The display 700 may include a graph 702 summarizing how much the MCP's content was streamed over a duration. In particular, the graph 702 shows changes in the listening volume (how much the MCP's content was being streamed throughout the day) over the duration. For example, at 7:22 only 2 of the MCP's songs were being streamed, whereas two minutes later, at 7:24, 16 of the MCP's songs were being streamed.

A live reporting of the blockchain 704 is displayed below the graph 702 showing each individual stream. The live blockchain reporting 704 may include the username/account 706 of the listener who streamed the song that identifies the listener, the username/account 708 of the MCP that identifies the MCP, the title 710 or name of the media content streamed, the status 712 (whether or not the stream has been reported), and a timestamp 714 (when the media content was streamed).

Thus, a technical effect of reducing streaming cost, while increasing royalty payments to content producers is achieved by an online media marketplace that utilizes the steady inflation of the market cap of a blockchain token to pay media producers instead of a subscription fee from various consumers. Further, a technical effect of more accurately allocating royalty payments is achieved by utilizing the enhanced reporting scheme provided by a blockchain to pay media producers based on total stream duration. Thus, another technical effect of increasing streaming and royalty payment transparency and security is achieved by providing a complete publicly available accounting of all streams on a blockchain.

Yet another technical effect is achieved according to the above royalty apportionment scheme. In particular, the royalty apportionment scheme may provide greater profit for new artists since each listener is allocated a given percentage of the total royalty pool. Thus, so long as a new media content producer has a loyal base of listeners that listen to primarily that content producers' content, the content producer will be paid better than conventional royalty apportionment schemes, because each listener is assigned an equivalent value when apportioning the royalty payments amongst the producers.

Another technical effect of offering an additional payment mechanism for media content producers, and one that is transparent (can be independently verified by any user on the blockchain) is achieved by using the secure, immutable reporting scheme offered by a blockchain in combination with the steady inflation of the market cap of the blockchain's utility token. That is by using the secureness of the reporting scheme offered by the blockchain in combination with the inflation of the market cap of the blockchain's utility token, media content producers can be paid in an additional way (through the issuance of new media content tokens which correspond to a particular dollar value) that is transparent, can be independently verified, and is thus accurate.

Another technical effect of increasing the efficiency of the stream reporting and increasing the granularity, accuracy, and level of detail of the reporting is achieved by using the blockchain to publish these stream reports. Because the blockchain can create new block much more quickly than conventional reporting systems can compile reports, the stream reports are published with much higher frequency, allowing the media content producers to receive feedback more quickly on how their content is being received. Further, because the stream reports may comprise information regarding just a single stream, the reporting is more granular and detailed than conventional reporting systems that aggregate data together, thus enabling media content producers to see more accurately how their content is being received. Thus, media content producers may receive more accurate, more detailed, and more responsive feedback.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
   streaming media content from a streaming platform to a consumer device;
   measuring a duration of a stream of the media content to the consumer device, wherein the duration corresponds to an amount of time that the media content is actively provided to the consumer device;
   creating a stream report for the streamed media content based on a smart contract associated with the media content, wherein the smart contract identifies a media content producer of the media content and wherein the stream report includes the duration of the stream of the media content to the consumer device, wherein the stream report comprises streaming information for the consumer device compiled over a period of time, the streaming information including one or more of:
   a title of the media content streamed,
   a total duration for which the media content was streamed, wherein the total duration corresponds to a total amount of time that the media content was actively provided to the consumer device during the period of time,
   a consumer identity associated with the stream, and
   the media content producer of the media content;

recording the stream report on a blockchain;
issuing tokens based on a pre-determined rate of inflation, wherein the pre-determined rate of inflation indicates a rate of increase over a period of time of a total number of issued tokens; and
distributing a portion of the tokens to the media content producer based on the stream report, wherein distributing the portion of the tokens to the media content producer based on the stream report comprises distributing the portion of the tokens to a wallet address of the media content producer, wherein the wallet address of the media content producer is included within the smart contract.

2. The method of claim 1, wherein distributing the portion of the tokens to the media content producer based on the stream report comprises determining the portion of the tokens based on the duration of the media content.

3. The method of claim 1, wherein the tokens comprise digital assets maintained on the blockchain.

4. The method of claim 3, wherein the digital assets comprise a smart contract exchangeable for a fixed amount of fiat currency.

5. The method of claim 1, wherein recording the stream report on the blockchain comprises adding the stream report to a block of the blockchain, and publishing the block to the blockchain.

6. The method of claim 5, wherein the stream report is one of a plurality of stream reports, and wherein the plurality of stream reports is added to the block.

7. The method of claim 1, wherein the pre-determined rate of inflation is determined by vesting token holders implementing a consensus algorithm.

8. The method of claim 1, wherein the portion of the tokens is a first portion of the tokens, the method further comprising:
distributing a second portion of the tokens amongst a plurality of vesting token holders and a plurality of block producers.

9. The method of claim 8, wherein the first portion of the tokens comprises a plurality of stable tokens, and wherein the second portion of the tokens comprises a plurality of utility tokens.

10. A system comprising:
a remote server communicatively coupled with a consumer device and a media content producer device for receiving and storing media content uploaded from the media content producer device and delivering the media content to the consumer device, the remote server comprising computer readable instructions stored in non-transitory memory for performing operations, the operations comprising:
streaming media content to a consumer device;
measuring a duration of a stream of the media content to the consumer device, wherein the duration corresponds to an amount of time that the media content is actively provided to the consumer device;
creating a stream report for the streamed media content based on a smart contract associated with the media content, wherein the smart contract identifies a media content producer of the media content and wherein the stream report includes the duration of the stream of the media content to the consumer device, wherein the stream report comprises streaming information for the consumer device compiled over a period of time, the streaming information including one or more of:
a title of the media content streamed,
a total duration for which the media content was streamed, wherein the total duration corresponds to a total amount of time that the media content was actively provided to the consumer device during the period of time,
a consumer identity associated with the stream, and
the media content producer of the media content;
recording the stream report on a blockchain;
issuing tokens based on a pre-determined rate of inflation, wherein the pre-determined rate of inflation indicates a rate of increase over a period of time of a total number of issued tokens; and
distributing a portion of the tokens to the media content producer based on the stream report, wherein distributing the portion of the tokens to the media content producer based on the stream report comprises distributing the portion of the tokens to a wallet address of the media content producer, wherein the wallet address of the media content producer is included within the smart contract.

11. The system of claim 10, wherein distributing the portion of the tokens to the media content producer based on the stream report comprises determining the portion of the tokens based on the duration of the media content.

12. The system of claim 10, wherein the tokens comprise digital assets maintained on the blockchain.

13. The system of claim 12, wherein the digital assets comprise a smart contract exchangeable for a fixed amount of fiat currency.

14. The system of claim 10, wherein the pre-determined rate of inflation is determined by vesting token holders implementing a consensus algorithm.

15. The system of claim 10, wherein the portion of the tokens is a first portion of the tokens, and wherein the operations further comprise:
distributing a second portion of the tokens amongst a plurality of vesting token holders and a plurality of block producers,
wherein the first portion of the tokens comprises a plurality of stable tokens, and wherein the second portion of the tokens comprises a plurality of utility tokens.

* * * * *